(12) United States Patent
Kawanishi et al.

(10) Patent No.: US 9,039,214 B2
(45) Date of Patent: May 26, 2015

(54) VEHICLE OUTSIDE REARVIEW MIRROR DEVICE

(75) Inventors: Jouichi Kawanishi, Isehara (JP); Takahiro Kitamura, Nagoya (JP)

(73) Assignees: ICHIKOH INDUSTRIES, LTD., Isehara-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 200 days.

(21) Appl. No.: 13/327,095

(22) Filed: Dec. 15, 2011

(65) Prior Publication Data

US 2012/0154940 A1 Jun. 21, 2012

(30) Foreign Application Priority Data

Dec. 17, 2010 (JP) ................................. 2010-282362

(51) Int. Cl.
*B60R 1/08* (2006.01)
*B60R 1/074* (2006.01)
*B60R 1/06* (2006.01)

(52) U.S. Cl.
CPC .. *B60R 1/074* (2013.01); *B60R 1/06* (2013.01)

(58) Field of Classification Search
CPC ............ B60R 1/06; B60R 1/08; B60R 1/0174

USPC .............................. 359/841, 871–877; 701/49
See application file for complete search history.

(56) References Cited

U.S. PATENT DOCUMENTS

2008/0247068 A1* 10/2008 Wakabayashi ................ 359/871
2009/0244744 A1  10/2009 Okamoto et al.
2009/0279195 A1* 11/2009 Itoh et al. ...................... 359/872

FOREIGN PATENT DOCUMENTS

| CN | 1607152 A | 4/2005 |
|----|-----------|--------|
| CN | 1621284 A | 6/2005 |
| CN | 101544208 A | 9/2009 |
| JP | 05-035493 U | 5/1993 |
| JP | 2000-318522 A | 11/2000 |
| JP | 2010-168023 | 8/2010 |

* cited by examiner

*Primary Examiner* — Jennifer L. Doak
(74) *Attorney, Agent, or Firm* — Foley & Lardner LLP (57) ABSTRACT

In a vehicle outside rearview mirror device including a mirror housing capable of tilting with respect to a vehicle body, the vehicle outside rearview mirror device includes a base fixed to the vehicle body; a shaft fixed to the base; and the mirror housing mounted to the shaft so as to be capable of tilting, wherein a wall that reduces a flow rate of a wind passing through a gap between the base and the mirror housing is provided to the shaft.

6 Claims, 8 Drawing Sheets

VEHICLE OUTSIDE REARVIEW MIRROR DEVICE

CROSS-REFERENCE TO RELATED APPLICATIONS

The present application claims priority to and incorporates by reference the entire contents of Japanese Patent Application No. 2010-282362 filed in Japan on Dec. 17, 2010.

BACKGROUND OF THE INVENTION

1. Field of the Invention

The present invention relates to a vehicle outside rearview mirror device in which a mirror assembly can be tilted (rotated, swung) with respect to a vehicle body. Specifically, the present invention relates to a vehicle outside rearview mirror device such as a retractable power door mirror or manually retractable door mirror.

2. Description of the Related Art

The vehicle outside rearview mirror devices of this type have conventionally been employed. Examples thereof include a vehicle outside rearview mirror device described in Japanese Patent Application Laid-open No. 2010-168023. The conventional vehicle outside rearview mirror device will be described below.

The conventional vehicle outside rearview mirror device includes a mirror base mounted to a door of the vehicle, a rotation shaft that is provided to stand on a upward-facing surface of the mirror base, and a mirror housing that is supported to the rotation shaft so as to be rotatable, wherein a concave portion is formed on a downward-facing surface of the mirror housing, which is opposite to the upward-facing surface of the mirror base, and projections are arranged in the concave portion as being dispersed.

In the vehicle outside rearview mirror device described above, the projections can suppress whistling noise generated by airflow passing through a gap between the upward-facing surface of the mirror base and the downward-facing surface of the mirror housing.

As described above, it is important and it is a problem, in the vehicle outside rearview mirror device, to suppress the whistling noise generated by airflow passing through the gap between the upward-facing surface of the mirror base and the downward-facing surface of the mirror housing.

SUMMARY OF THE INVENTION

It is an object of the present invention to at least partially solve the problems in the conventional technology.

According to one aspect of the present invention, a vehicle outside rearview mirror device including a mirror housing capable of tilting with respect to a vehicle body, the vehicle outside rearview mirror device includes a base fixed to the vehicle body; a shaft fixed to the base; and the mirror housing mounted to the shaft so as to be capable of tilting, wherein a wall that reduces a flow rate of a wind passing through a gap between the base and the mirror housing is provided to the shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Four embodiments out of the embodiments of a vehicle outside rearview mirror device according to the present invention will be described below with reference to the drawings. The present invention is not limited by these embodiments.

FIGS. 1 to 5 illustrate a vehicle outside rearview mirror device according to a first embodiment of the present invention. The vehicle outside rearview mirror device in the first embodiment is a retractable power door mirror device (retractable power door mirror) 1. The retractable power door mirror device 1 is provided each to a right door and a left door of an automobile. The configuration of the retractable power door mirror device 1 provided to the right door of the automobile will be described below. The right and left are almost reversed between the retractable power door mirror device provided to the left door of the automobile and the retractable power door mirror device 1 provided to the right door of the automobile. Therefore, the configuration of the retractable power door mirror device provided to the left door of the automobile will not be described.

Figure 1:
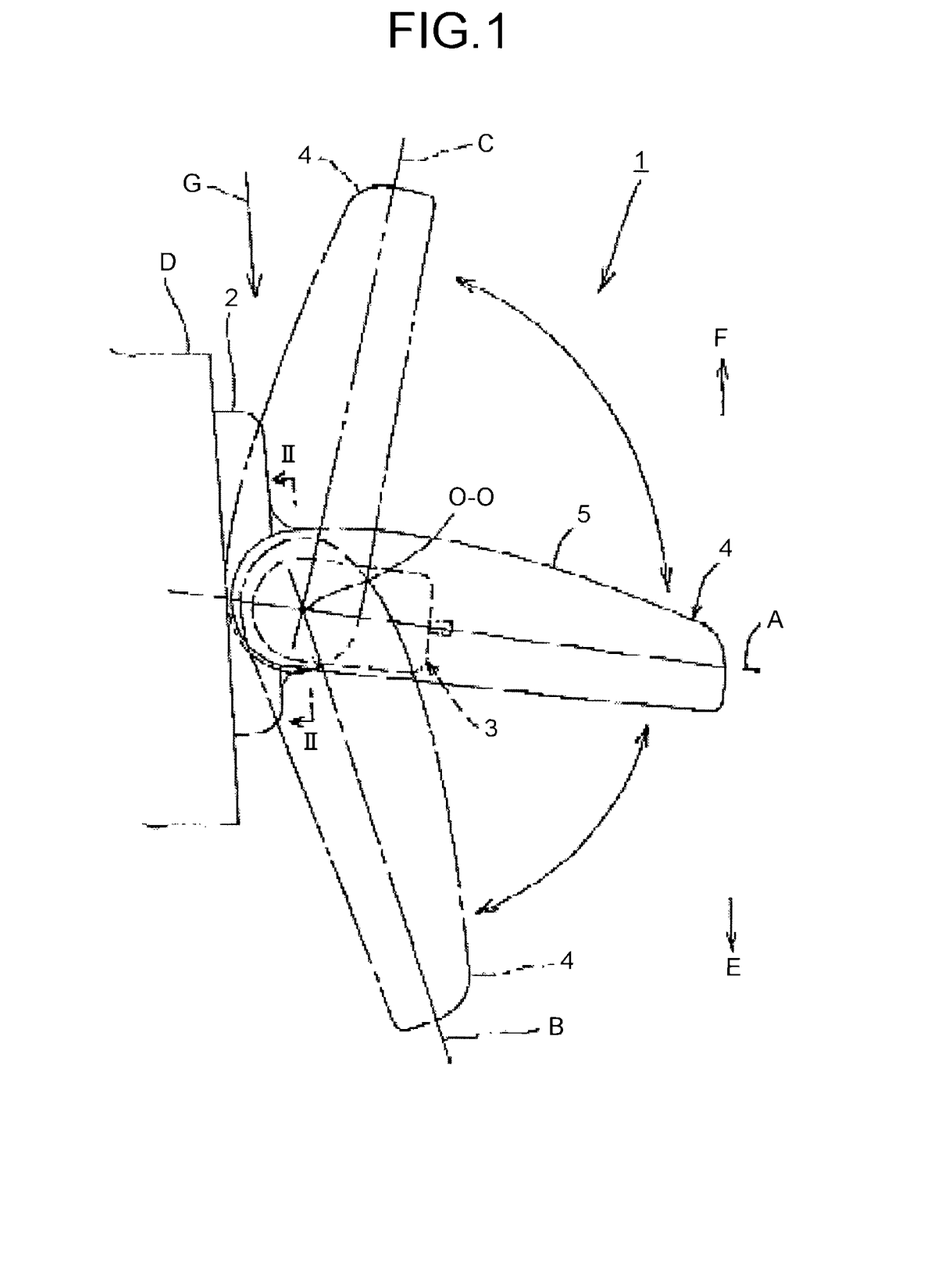
FIG. 1 is a plan view illustrating a used state of a vehicle outside rearview mirror device according to a first embodiment of the present invention.
Figure 2:
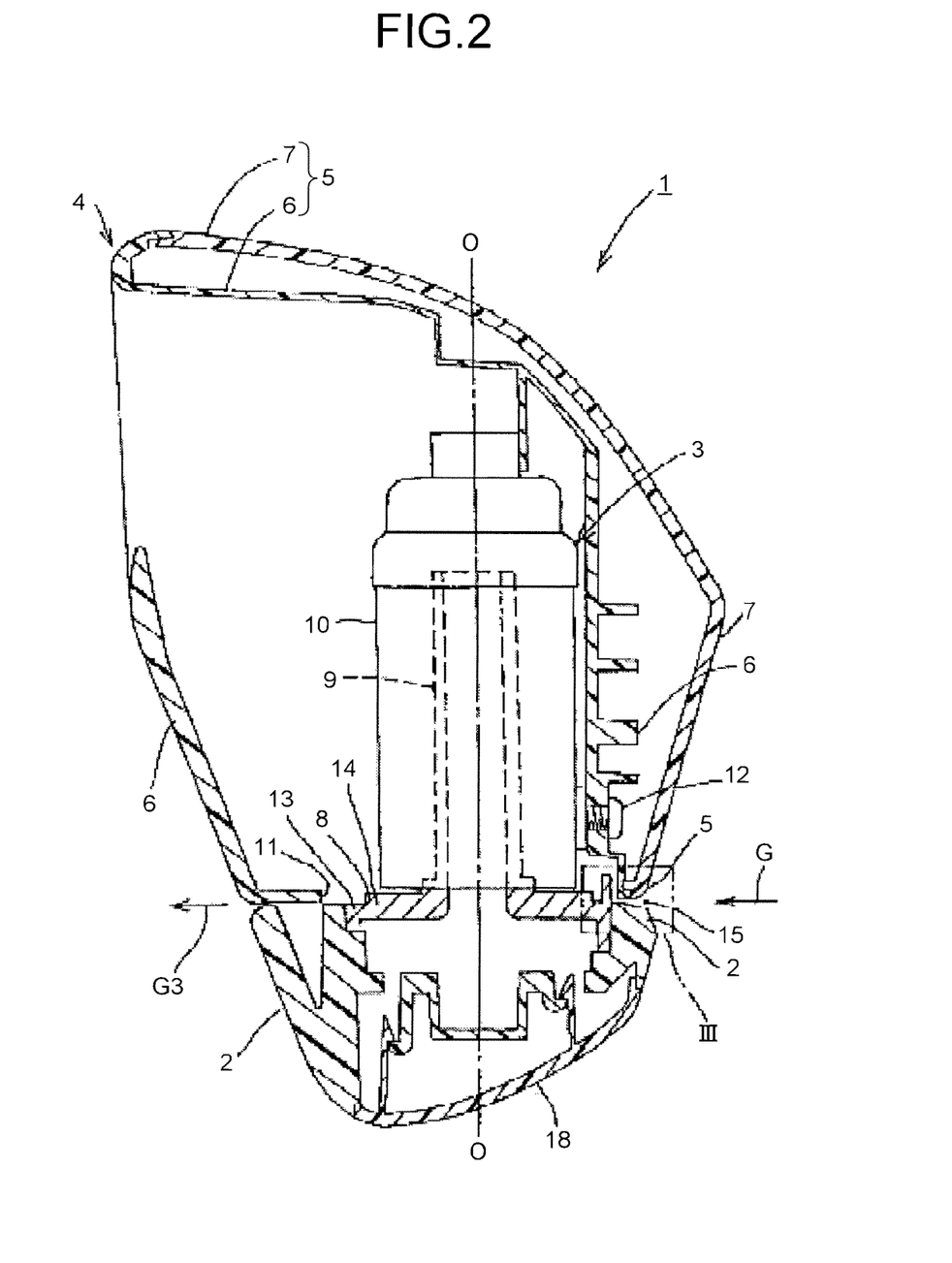
FIG. 2 is a sectional view taken along a line II-II in FIG. 1.

As illustrated in FIG. 2, the retractable power door mirror device 1 includes a base (mirror base) 2 fixed to a vehicle body (door of the automobile) D, a shaft 9 fixed to the base 2, and a mirror housing 5 mounted to the shaft 9 so as to be capable of tilting. Specifically, the retractable power door mirror device 1 is mounted such that a mirror assembly 4 (mirror housing 5) is mounted to the door D so as to be rotatable through an electronic retractable unit 3 (the shaft 9) and the base 2 as illustrated in FIG. 1. The base 2 is fixed to the door D. A cover 18 is mounted at the lower part of the base 2.

As illustrated in FIG. 2, the mirror assembly 4 includes the mirror housing 5, a power unit (not illustrated), and an unillustrated mirror (mirror unit). The mirror housing 5 includes a main body 6 serving also as a mounting bracket, and a cover 7 mounted to the main body 6. The power unit is mounted to the main body 6. The mirror is mounted to the power unit so as to be capable of tilting in the vertical direction and lateral direction.

As illustrated in FIG. 2, the electronic retractable unit 3 includes a shaft holder 8, the shaft 9, a casing (gear case and cover) 10, a motor (not illustrated), a deceleration mechanism (not illustrated) serving as a rotation force transmission mechanism, a clutch mechanism (not illustrated) and the like.

As illustrated in FIG. 2, the shaft 9 is integrally mounted at the center of one surface (top surface) of the shaft holder 8. The shaft 9 has a hollow shape, wherein a harness (not illustrated) can be inserted therein. The casing 10 is mounted to the shaft 9 so as to be capable of rotating about a rotation center O-O of the shaft 9. The motor, the deceleration mechanism serving as the rotation force transmission mechanism, and the clutch mechanism are stored in the casing 10. The electronic retractable unit 3 includes a fixed portion having the shaft holder 8 and the shaft 9, and a rotation portion having the casing 10.

As illustrated in FIG. 2, an insertion opening 11 through which the electronic retractable unit 3 (the shaft 9) is inserted is formed at the portion (lower part, bottom part) of the mirror housing 5 opposite to the base 2. The electronic retractable unit 3 is stored in the mirror housing 5 of the mirror assembly 4. The casing 10 of the rotation portion of the electronic retractable unit 3 is mounted to the main body 6 of the mirror assembly 4 with a screw 12. The shaft holder 8 of the fixed portion side of the electronic retractable unit 3 is inserted through the insertion opening 11 of the mirror housing 5, and is fixed to the base 2 with an unillustrated screw. As a result, the mirror assembly 4 is mounted to the door D so as to be rotatable through the electronic retractable unit 3 and the base 2. Specifically, the mirror housing 5 is mounted to the shaft 9, which is fixed to the base 2, so as to be capable of tilting.

Figure 4:
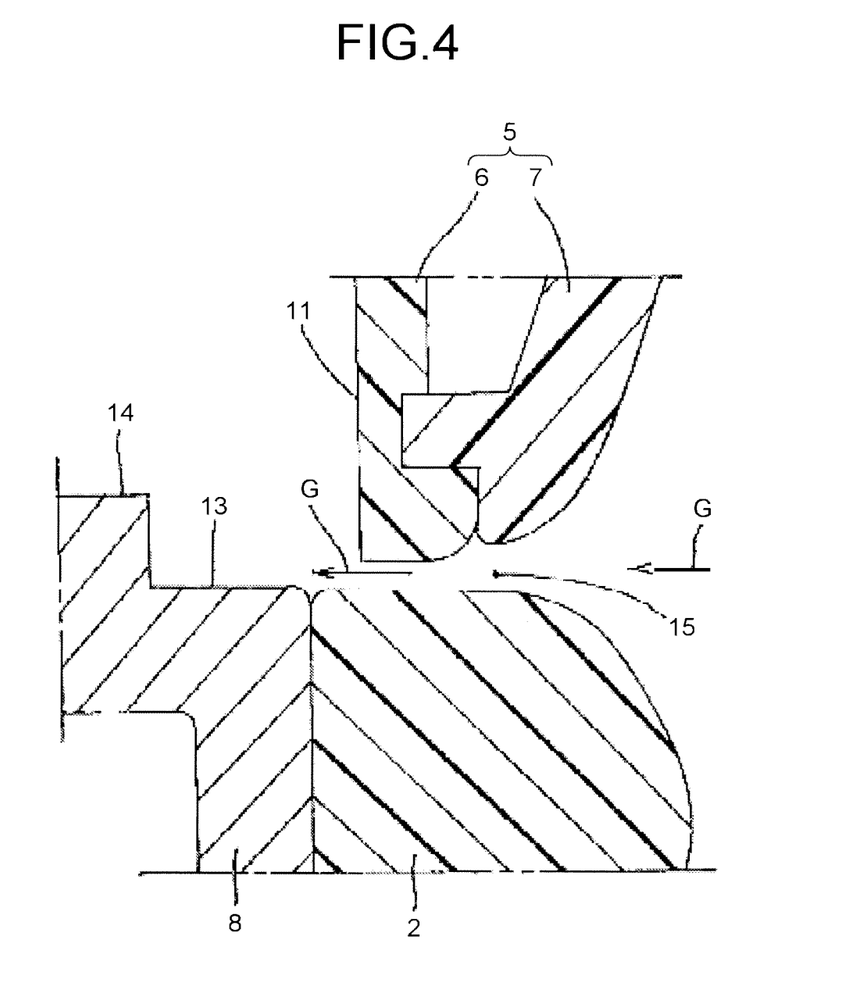
FIG. 4 is an enlarged sectional view (enlarged sectional view corresponding to FIG. 3) for explaining a problem when a wall and a turbulent portion are not formed.

As illustrated in FIG. 2, the top surface of the shaft holder 8 at a central part 14 is higher than an edge part (outer periphery part) 13 thereof. The shaft 9 is integrally formed at the center of the central part 14 of the top surface of the shaft holder 8. The top surface of the shaft holder 8 at the central part 14 and the lower surface of the casing 10 of the rotation portion side are proximate to each other as being parallel to each other. The top surface of the base 2 of the fixed portion side and the lower surface of the mirror housing 5 of the mirror assembly 4 at the rotation side are proximate to each other as being parallel to each other via the gap 15. The top surface of the edge part 13 of the shaft holder 8 is almost flush with the top surface of the base 2 as illustrated in FIG. 2 (FIG. 4).

Figure 3:
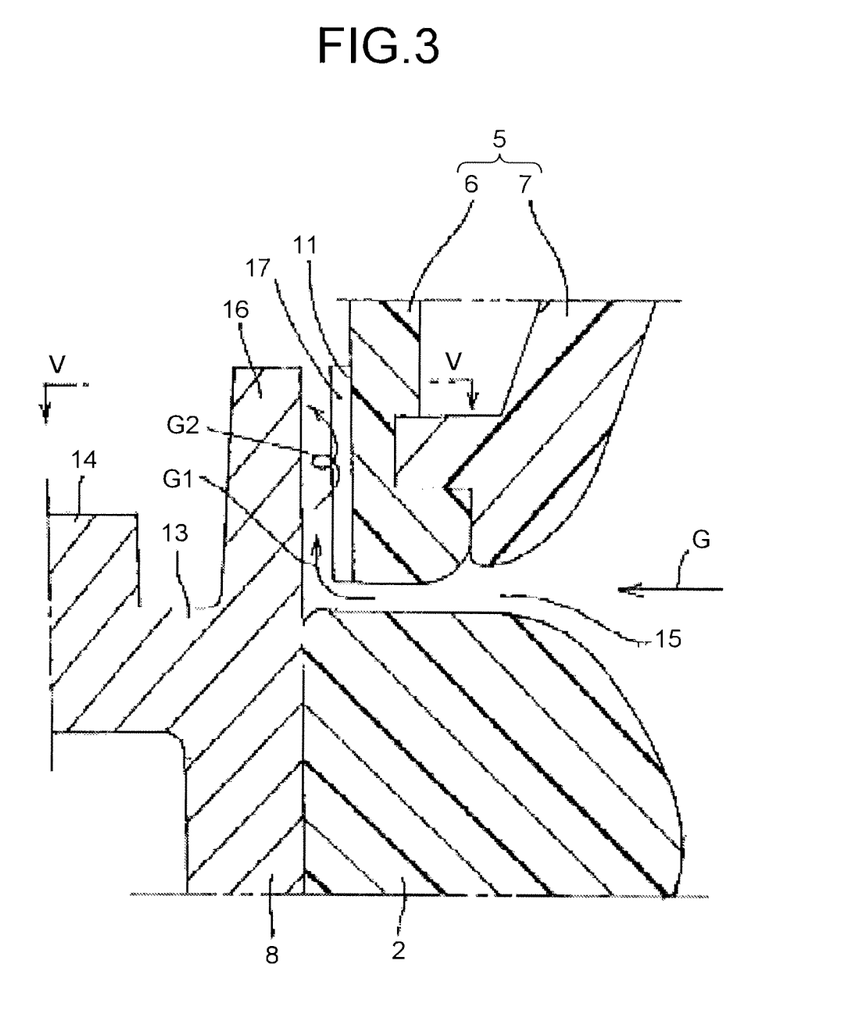
FIG. 3 is an enlarged sectional view of a portion III in FIG. 2.

As illustrated in FIGS. 2 and 3, a wall 16 having an arc shape is integrally formed on the top surface of the edge part 13 of the shaft holder 8 that is integral with the shaft 9. The wall 16 is to reduce a flow rate of wind G passing though the gap 15 between the top surface of the base 2 and the lower surface of the mirror housing 5. The wall 16 is provided to be proximate to the surface (inner peripheral surface) of the insertion opening 11 of the mirror housing 5.

Figure 5:
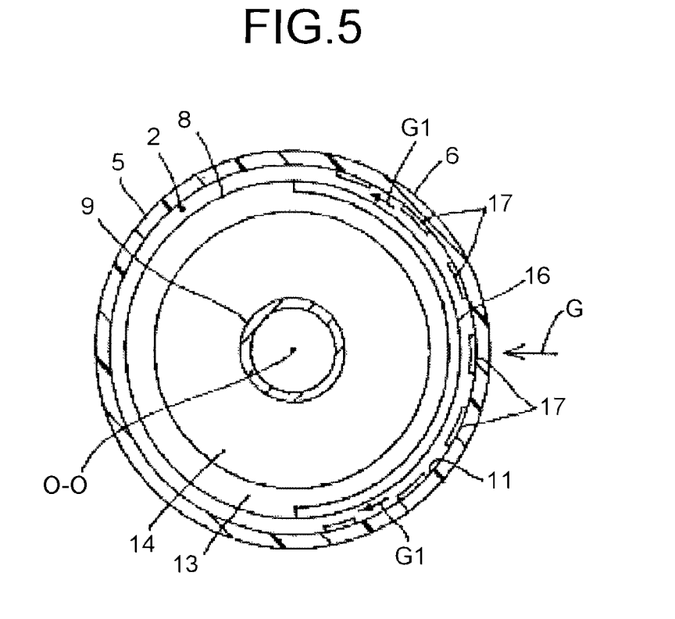
FIG. 5 is a sectional view taken along a line V-V in FIG. 3.

As illustrated in FIGS. 3 and 5, a turbulent portion 17 is provided on the surface of the insertion opening 11 of the mirror housing 5. The turbulent portion 17 is plural ribs integrally formed in the direction of the rotation center O-O of the shaft 9 in the present embodiment. The turbulent portion 17 disturbs the flow of the wind G1 whose flow rate is reduced by the wall 16, as indicated by G2 in FIG. 3.

As illustrated in FIG. 5, when the mirror housing 5, i.e., the mirror assembly 4, is located at a used position A, the wall 16 of the shaft holder 8 integral with the shaft 9 and the turbulent portion 17 of the mirror housing 5 are arranged at the front part F of the vehicle. The range where the wall 16 and the turbulent portion 17 are provided is within an open angle of 180 degrees.

The vehicle outside rearview mirror device according to the first embodiment, i.e., the retractable power door mirror device 1, is configured as described above. The operation thereof will be described below.

When a switch (not illustrated) in an interior of the automobile is operated, a motor of the electronic retractable unit 3 is driven, whereby the mirror assembly 4 located at the used position A is electrically rotated to be stored in a storage position B due to the operation of the clutch mechanism as illustrated in FIG. 1. Alternatively, the mirror assembly 4 located at the storage position B is electrically rotated to return to the used position A.

When manual force is applied to the mirror assembly 4 located at the used position A, the clutch of the clutch mechanism is disengaged due to cushioning, so that the mirror assembly 4 is rotated from the used position A to the storage position B or from the used position A to a forward tilting position C, as illustrated in FIG. 1. The mirror assembly 4 can be returned to the used position A by rotating the mirror assembly 4 located at the storage position B or the forward tilting position C.

When the vehicle runs forward with the mirror assembly 4 being located at the used position A, the wind G flows from the front F of the vehicle to a rear E. With this, the wind G passes through the gap 15 between the top surface of the base 2 and the lower surface of the mirror housing 5 to go into the mirror housing 5 as illustrated in FIGS. 2 and 3.

The wind G going into the mirror housing 5 immediately hits against the wall 16 of the shaft holder 8 that is integral with the shaft 9, and then, flows upward (see FIG. 3) or flows around (see FIG. 5) along the wall 16 as decelerating (see the wind G1).

The wind G1, which decelerates due to the hit against the wall 16, is disturbed by the turbulent portion 17 (see the wind G2 in FIG. 3). The wind G2 that is disturbed further decelerates and flows out of the mirror housing 5 toward the outside (see the wind G3 in FIG. 2).

As described above, the wind G passing through the gap 15 between the top surface of the base 2 and the lower surface of the mirror housing 5 can be decelerated, whereby wind noise generated during the drive of the vehicle can be suppressed.

The vehicle outside rearview mirror device, i.e., the retractable power door mirror device 1, according to the first embodiment is configured as described above, and has the operation described above. The effect thereof will next be described.

When the vehicle runs forward, in particular, the wind G passing through the gap 15 between the top surface of the base 2 and the lower surface of the mirror housing 5 directly hits against the wall 16 of the shaft holder 8 that is integral with the shaft 9 in the retractable power door mirror device 1. Therefore, the flow rate of the wind G passing through the gap 15 between the top surface of the base 2 and the lower surface of the mirror housing 5 can be reduced (decelerated) (see the wind G1). As a result, the retractable power door mirror device 1 can reduce (suppress) the wind noise (whistling noise) generated by the wind G passing through the gap 15 between the top surface of the base 2 and the lower surface of the mirror housing 5. A test driving showed an effect that the wind noise was not detectable by human ear.

In the case of a vehicle outside rearview mirror device in which the wall 16 is not provided to the top surface of the edge part 13 of the shaft holder 8 that is integral with the shaft 9 as illustrated in FIG. 4, the top surface at the edge part 13 of the shaft holder 8 is almost flush with the top surface of the base 2. Therefore, the wind G passing through the gap 15 between the top surface of the base 2 and the lower surface of the mirror housing 5 passes through the gap 15 between the top surface of the base 2 and the lower surface of the mirror housing 5 without being blocked by the wall 16, i.e., without reducing the flow rate (without decelerating) but with the flow rate being kept. Accordingly, the wind noise cannot be reduced (suppressed) by the vehicle outside rearview mirror device described above.

Further, in the retractable power door mirror device 1, the wall 16 is provided integral with the shaft holder 8 that is integral with the shaft 9, whereby a separate member does not have to be provided. Consequently, according to the retractable power door mirror device 1, the number of components can be reduced, and the production cost can be decreased, compared to a mirror device that reduces the wind noise by a separate member.

In the retractable power door mirror device 1, the wall 16 of the shaft holder 8 that is integral with the shaft 9 is provided to be proximate to the surface of the insertion opening 11 of the mirror housing 5. Therefore, the wind G passing through the gap 15 between the top surface of the base 2 and the lower surface of the mirror housing 5 immediately hits against the wall 16 of the shaft holder 8 that is integral with the shaft 9, whereby the flow rate of the wind G, passing through the gap 15 between the top surface of the base 2 and the lower surface of the mirror housing 5, can surely be reduced. Specifically, the wind noise generated by the wind G, passing through the gap 15 between the top surface of the base 2 and the lower surface of the mirror housing 5, can surely be reduced.

In the retractable power door mirror device 1, the flow of the wind G1 whose flow rate is reduced by the wall 16 is disturbed by the turbulent portion 17 of the mirror housing 5. As a result, in the retractable power door mirror device 1, the flow rate of the wind G1 is further reduced (see the wind G2), so that the wind noise generated by the wind G, passing through the gap 15 between the top surface of the base 2 and the lower surface of the mirror housing 5, can more surely be reduced.

The retractable power door mirror device 1 also has the turbulent portion 17 at the mirror housing 5. Therefore, a separate member does not have to be provided. Consequently, according to the retractable power door mirror device 1, the number of components can be reduced, and the production cost can be decreased, compared to a mirror device that disturbs the flow of the wind by a separate member.

In the retractable power door mirror device 1, the wall 16 of the shaft holder 8 that is integral with the shaft 9 is provided to a certain portion on the outer periphery of the edge part 13 of the shaft holder 8, and the turbulent portion 17 is provided to a certain portion on the inner peripheral surface of the insertion opening 11 of the mirror housing 5, i.e., they are provided at the front part F side of the vehicle when the mirror housing 5 (mirror assembly 4) is located at the used position A. Accordingly, the retractable power door mirror device 1 can surely reduce the flow rate of the wind G passing through the gap 15 between the top surface of the base 2 and the lower surface of the mirror housing 5. The retractable power door mirror device 1 according to the first embodiment has reduced weight, and simple configuration, compared to a mirror device in which the wall 16 on the shaft holder 8 that is integral with the shaft 9 is provided on the whole outer periphery of the edge part 13 of the shaft holder 8, and the turbulent portion 17 is provided on the whole inner peripheral surface of the insertion opening 11 of the mirror housing 5. Accordingly, the production cost can be decreased.

In the retractable power door mirror device 1, the shaft holder 8 is fixed to the base 2 in such a manner that the top surface at the edge part 13 of the shaft holder 8 is almost flush with the top surface of the base 2. Therefore, the overall device can be downsized in the axial direction of the shaft 9 (in the direction of the rotation center O-O of the shaft 9), whereby the present embodiment is optimally applied to a small-sized mirror device.

In the retractable power door mirror device 1, the wall 16 is provided integral with the top surface of the edge part 13 of the shaft holder 8, and the turbulent portion 17 is formed integral with the inner peripheral surface of the insertion opening 11 of the mirror housing 5. Therefore, compared to a mirror device having another member provided thereto, the number of the components can be reduced, and the increase in the production cost can be avoided.

Figure 6:
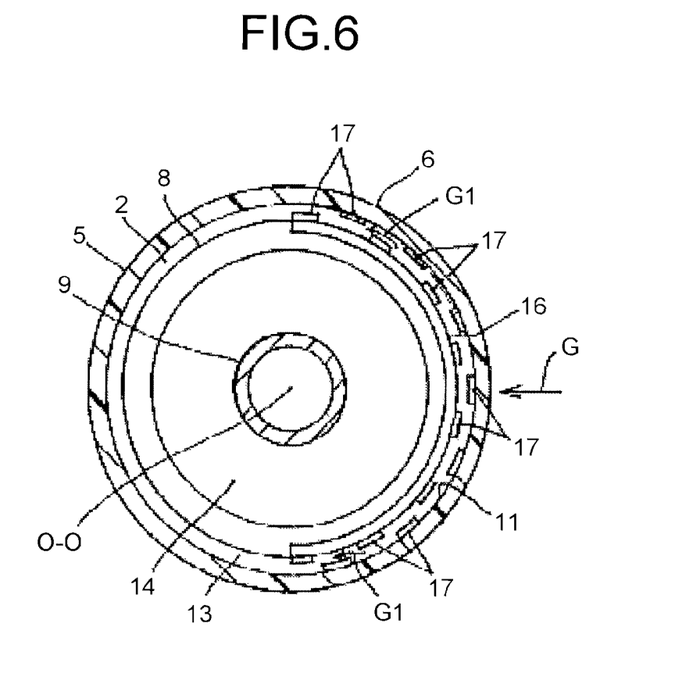
FIG. 6 is a sectional view (sectional view corresponding to FIG. 5) illustrating a vehicle outside rearview mirror device according to a second embodiment of the present invention.

FIG. 6 illustrates a vehicle outside rearview mirror device according to a second embodiment of the present invention. In FIG. 6, the components same as those in FIGS. 1 to 5 are identified by the same numerals. In the above-mentioned first embodiment, the turbulent portion 17 is provided on the inner peripheral surface of the insertion opening 11 of the mirror housing 5. On the other hand, in the second embodiment, the turbulent portion 17 is provided on the inner peripheral surface of the insertion opening 11 of the mirror housing 5, and on the outer peripheral surface of the wall 16 on the shaft holder 8 that is integral with the shaft 9. The vehicle outside rearview mirror device according to the second embodiment can provide the operation and effect almost same as those of the vehicle outside rearview mirror device according to the first embodiment.

Figure 7:
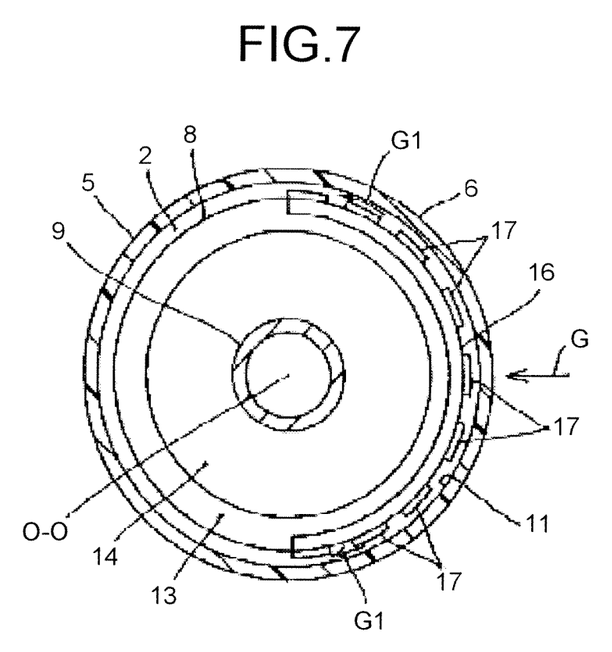
FIG. 7 is a sectional view (sectional view corresponding to FIG. 5) illustrating a vehicle outside rearview mirror device according to a third embodiment of the present invention.

FIG. 7 illustrates a vehicle outside rearview mirror device according to a third embodiment. In FIG. 7, the components same as those in FIGS. 1 to 6 are identified by the same numerals. In the first embodiment, the turbulent portion 17 is provided on the inner peripheral surface of the insertion opening 11 of the mirror housing 5, while in the second embodiment, the turbulent portion 17 is provided on the inner peripheral surface of the insertion opening 11 of the mirror housing 5 and on the outer peripheral surface of the wall 16 on the shaft holder 8 that is integral with the shaft 9. On the other hand, in the third embodiment, the turbulent portion 17 is provided on the outer peripheral surface of the wall 16 on the shaft holder 8 that is integral with the shaft 9. The vehicle outside rearview mirror device according to the third embodiment can provide the operation and effect almost same as those of the vehicle outside rearview mirror device according to the first and the second embodiments.

Figure 8:
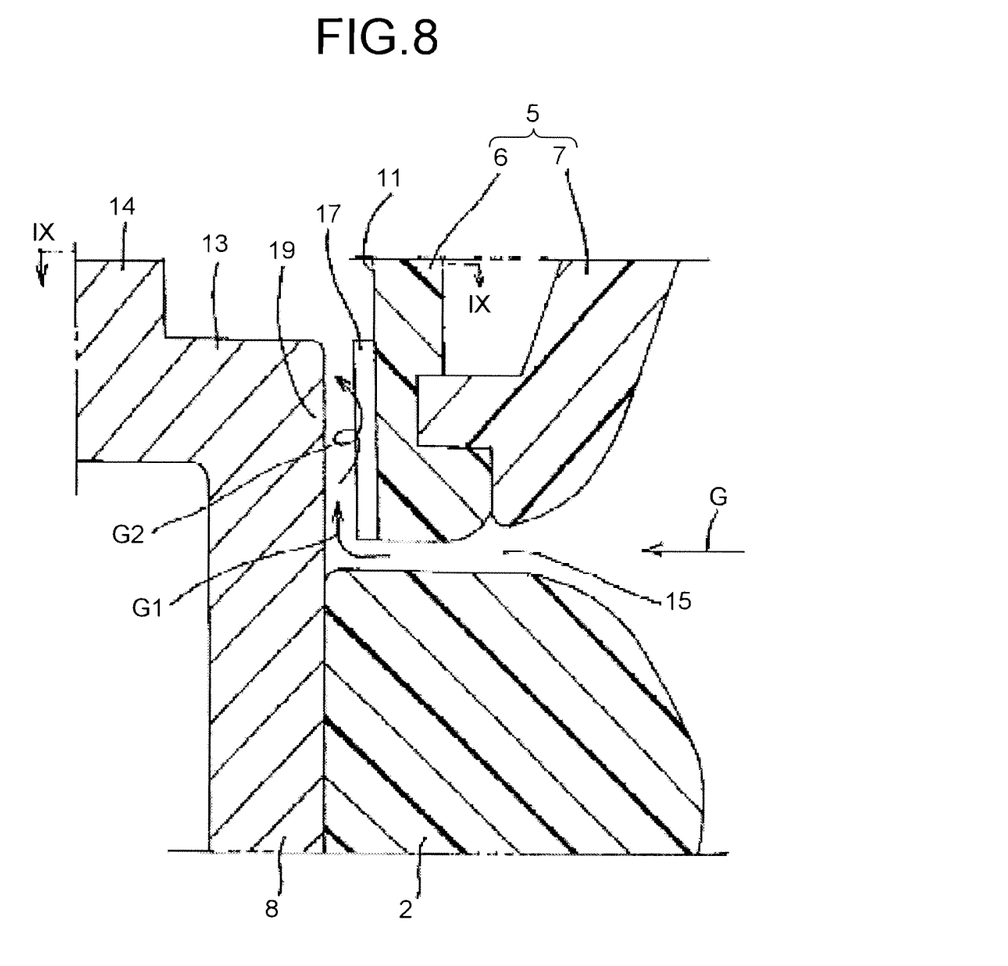
FIG. 8 is a sectional view (sectional view corresponding to FIG. 3) illustrating a vehicle outside rearview mirror device according to a fourth embodiment of the present invention.
Figure 9:
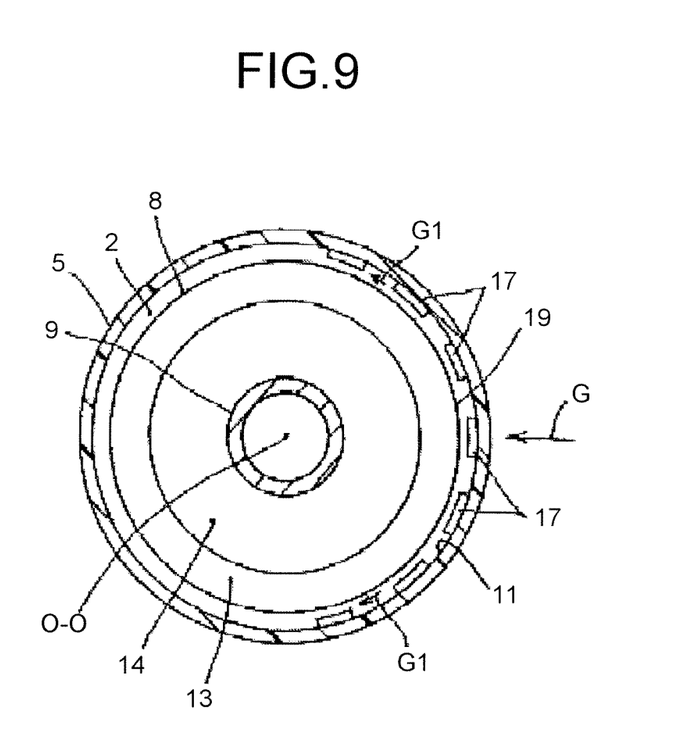
FIG. 9 is a sectional view taken along a line IX-IX in FIG. 8.

FIGS. 8 and 9 illustrate a vehicle outside rearview mirror device according to a fourth embodiment of the present invention. In FIGS. 8 and 9, the components same as those in FIGS. 1 to 7 are identified by the same numerals. The portion where the electronic retractable unit 3 is located at the upper part, and the edge part 13 of the shaft holder 8 that is integral with the shaft 9 is located at the inside of the mirror housing 5. The edge part 13 is defined as a wall 19 that reduces the flow rate of the wind G passing through the gap 15 between the top surface of the base 2 and the lower surface of the mirror housing 5.

The vehicle outside rearview mirror device according to the fourth embodiment can provide the operation and effect almost same as those of the vehicle outside rearview mirror device according to the first, second and third embodiments. In particular, in the vehicle outside rearview mirror device according to the fourth embodiment, the portion where the electronic retractable unit 3 is located at the upper part, and the edge part 13 of the shaft holder 8 that is integral with the shaft 9 is defined as the wall 19. Therefore, the size of the overall device is increased in the axial direction of the shaft 9 (in the direction of the rotation center O-O of the shaft 9).

However, there is no need to provide the convex wall 16. Accordingly, the structure is simplified, and the production cost is reduced.

In the first to fourth embodiments described above, the retractable power door mirror device has been described. On the other hand, the present invention can be applied to a vehicle outside rearview mirror device other than the retractable power door mirror device. For example, the present invention can be applied to a vehicle outside rearview mirror device such as a vehicle retractable power fender mirror device, or a retractable power truck mirror device.

In the first to fourth embodiments described above, the retractable power door mirror device has been described. On the other hand, the present invention can be applied to a vehicle outside rearview mirror device other than the retractable power door mirror device. For example, the present invention can be applied to a manually retractable vehicle rearview mirror device such as a manually retractable door mirror device, a manually retractable vehicle fender mirror device, or a manually retractable truck mirror device. In the manually retractable type, a manually retractable unit is used instead of the electronic retractable unit 3. The manually retractable unit includes a shaft holder, a shaft that is integral with the shaft holder, a casing that is mounted to the shaft so as to be rotatable, and a clutch mechanism stored in the casing.

In the above-mentioned first to fourth embodiments, the turbulent portion 17 is made of ribs. However, in the present invention, the turbulent portion 17 may be formed by a dimple process, a honing process, or a texturing process, other than a process of forming ribs.

In the above-mentioned first to fourth embodiments, the walls 16 and 19 and the turbulent portion 17 are provided within a range of an open angle of 180 degrees. However, in the present invention, the walls 16 and 19 and the turbulent portion 17 may be provided within a range other than the open angle of 180 degrees, i.e., they may be provided within an open angle of 360 degrees or within an open angle of another optional degrees.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle outside rearview mirror device including a mirror housing capable of tilting with respect to a vehicle body, the vehicle outside rearview mirror device comprising:
    a base fixed to the vehicle body;
    a shaft fixed to the base; and
    the mirror housing mounted to the shaft so as to be capable of tilting,
    wherein a wall that reduces a flow rate of a wind passing through a gap between the base and the mirror housing is provided for the shaft,
    wherein an insertion opening through which the shaft is inserted is formed on a portion opposite to the base of the mirror housing,
    wherein the wall of the shaft is provided so as to be concentric with and coaxial to an inner peripheral surface of the insertion opening of the mirror housing, and
    wherein a turbulent portion that disturbs the flow of the wind flowing through the insertion opening of the mirror housing whose flow rate is reduced by the wall is provided on at least one of a surface of the insertion opening of the mirror housing and a surface of the wall of the shaft.

2. The vehicle outside rearview mirror device according to claim 1, wherein the wall of the shaft is mounted at a front side of the vehicle, when the mirror housing is located at a used position.

3. The vehicle outside rearview mirror device according to claim 1, wherein the turbulent portion is mounted at a front side of the vehicle, when the mirror housing is located at a used position.

4. The vehicle outside rearview mirror device according to claim 1, wherein the wall of the shaft is mounted at a front side of the vehicle, when the mirror housing is located at a used position.

5. The vehicle outside rearview mirror device of claim 1, wherein the wall is arc-shaped.

6. The vehicle outside rearview mirror device of claim 1, wherein the wall of the shaft is provided so as to be proximate to the surface of the insertion opening of the mirror housing.

* * * * *